United States Patent
Young et al.

(10) Patent No.: US 7,843,527 B2
(45) Date of Patent: Nov. 30, 2010

(54) DISPLAY DEVICE WITH ILLUMINATION LIGHT SOURCE

(75) Inventors: Nigel David Young, Redhill (GB); Steve Battersby, Haywards Heath (GB)

(73) Assignee: TPO Displays Corp. (TW)

( * ) Notice: Subject to any disclaimer, the term of this patent is extended or adjusted under 35 U.S.C. 154(b) by 122 days.

(21) Appl. No.: 12/164,273

(22) Filed: Jun. 30, 2008

(65) Prior Publication Data

US 2009/0167991 A1    Jul. 2, 2009

Related U.S. Application Data

(60) Provisional application No. 61/017,172, filed on Dec. 27, 2007.

(30) Foreign Application Priority Data

Jun. 24, 2008   (EP)   ................... 08158902

(51) Int. Cl.
    *G02F 1/1335*    (2006.01)
(52) U.S. Cl. ............... 349/63; 349/68; 349/96; 349/113
(58) Field of Classification Search ........... 349/61, 349/63, 69, 113
    See application file for complete search history.

(56) References Cited

U.S. PATENT DOCUMENTS

| 6,407,408 | B1 | 6/2002 | Zhou et al. |
| 6,556,260 | B1 | 4/2003 | Itou et al. |
| 6,714,268 | B2 | 3/2004 | Wang et al. |
| 6,781,647 | B2 * | 8/2004 | Fujieda ........................ 349/61 |
| 6,900,458 | B2 | 5/2005 | Tung et al. |
| 7,227,306 | B2 | 6/2007 | Park et al. |
| 7,630,027 | B2 * | 12/2009 | Koma ........................ 349/69 |
| 2002/0122144 | A1 * | 9/2002 | Yoshida et al. ................ 349/61 |

FOREIGN PATENT DOCUMENTS

JP    10-149881    11/2008

OTHER PUBLICATIONS

European Search Report for corresponding European patent application EP08158902; dated Sep. 26, 2008; 6 pages.

* cited by examiner

*Primary Examiner*—Hemang Sanghavi
(74) *Attorney, Agent, or Firm*—Lowe Hauptman Ham & Berner, LLP

(57) ABSTRACT

A display device includes a lower substrate, comprising reflective display pixel electrodes, an upper substrate and a liquid crystal layer provided between the substrates. A light source is provided on the upper substrate for illuminating the display electrodes through the liquid crystal layer. This arrangement provides a top light as an integrated structure within the liquid crystal display structure. The illumination can be efficiently provided to the pixel electrodes. This means that a light source pattern used can provide small light source areas.

9 Claims, 7 Drawing Sheets

DISPLAY DEVICE WITH ILLUMINATION LIGHT SOURCE

CROSS REFERENCE TO RELATED APPLICATIONS

This application claims the benefit of U.S. Provisional Application No. 61/017,172 filed on Dec. 27, 2007.

BACKGROUND OF THE INVENTION

1. Field of the Invention

The present invention relates to display devices, particularly to display devices with illumination light sources.

2. Description of the Related Art

The most widespread display technology is liquid crystal (LC) display technology. LC displays for mobile products need to operate over a very wide range of brightnesses and at as low power as possible.

If the displays are fully transmissive, then very powerful backlights are required for outdoor use. Thus, reflective and transflective displays have also been considered.

Reflective displays make use of the ambient illumination, and thus can not be seen in low light conditions. A solution for this is to add a top light which can be turned on in low ambient light conditions. However, it has not been possible previously to make a top light with good uniform illumination suitable for high performance displays. As a result, most displays on the market are transflective, making use of a backlight in low ambient light environments, and making use of the ambient light otherwise.

Such an arrangement gives a reasonably low power consumption, but image quality is very much compromised. Clearly, the most attractive option is a fully reflective display with a high quality top light whose brightness can be modified according to ambient light and image content.

BRIEF SUMMARY OF THE INVENTION

The present invention is directed to the problem of providing uniform top lighting.

According to the invention, there is provided a display device, comprising: a lower substrate, comprising reflective display pixel electrodes; an upper substrate; and a liquid crystal layer provided between the substrates, wherein the device further comprises a light source provided on the upper substrate for illuminating the display electrodes through the liquid crystal layer.

This arrangement provides a top light as an integrated structure within the liquid crystal display structure. By providing the top light as an integrated part of the device, the illumination can be efficiently provided to the pixel electrodes. This means that a light source pattern used can provide small light source areas (compared to the pixel size) and this prevents the opaque area resulting from the light source pattern (the light source is shielded from the viewer so that only reflected illumination is provided to the display output) having a significant effect on the quality of the display output.

The light source comprises an LED light source. For example, the light source can comprise an opaque electrode layer, an LED layer over the opaque electrode layer and on the side of the opaque electrode layer facing the liquid crystal layer, and a transparent electrode layer over the LED layer on the side of the LED layer facing the liquid crystal layer.

In one arrangement, wherein the two electrode layers and the LED layer are patterned to define a plurality of light source portions. In another arrangement, the opaque electrode layer is patterned to define a plurality of light source portions, and the transparent electrode layer and LED layer extend over the full display pixel area. Thus, the light source can easily be segmented in a number of different ways. This segmentation can be used to implement scrolling effects, in order to improve motion portrayal in known manner (at least at low to intermediate brightnesses when the light source will dominate the output of the device).

The light source can thus comprise a plurality of strips, with one or more strips associated with each row of display pixels. The light source strips can then be activated in synchronism with the addressing of the display which is for example also on a row-by-row basis.

The upper substrate or the lower substrate can be provided with a colour filter arrangement. The upper substrate further comprises a polarizer, which provides part of the function of the LC display panel.

The upper substrate further comprises a common electrode for the control of the liquid crystal layer. The lower substrate further comprises active matrix pixel circuits associated with the display pixel electrodes, and row and column addressing conductors which connect to the pixel circuits.

Thus, the light source arrangement can be integrated into a conventional LC display arrangement. The reflective display pixel electrodes can be textured to improve uniformity of the illumination.

The invention also provides a control method for a display device, comprising: in high ambient light conditions, providing a display output using reflected ambient light from reflective display pixel electrodes provided on a lower substrate, which reflected ambient passes through a liquid crystal layer which modulates the light and through an upper substrate; and in low ambient light conditions, operating a light source provided on the upper substrate to illuminate the display electrodes through the liquid crystal layer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a liquid crystal display having an active plate and a passive plate with a liquid crystal layer sandwiched between, and in which a light source is provided as an integrated part of the passive plate, for illuminating the display electrodes through the liquid crystal layer. The light source is a patterned white light fabricated on the inside surface of the passive plate of the LC cell. The conventional polariser can also form part of the passive plate.

Figure 1:
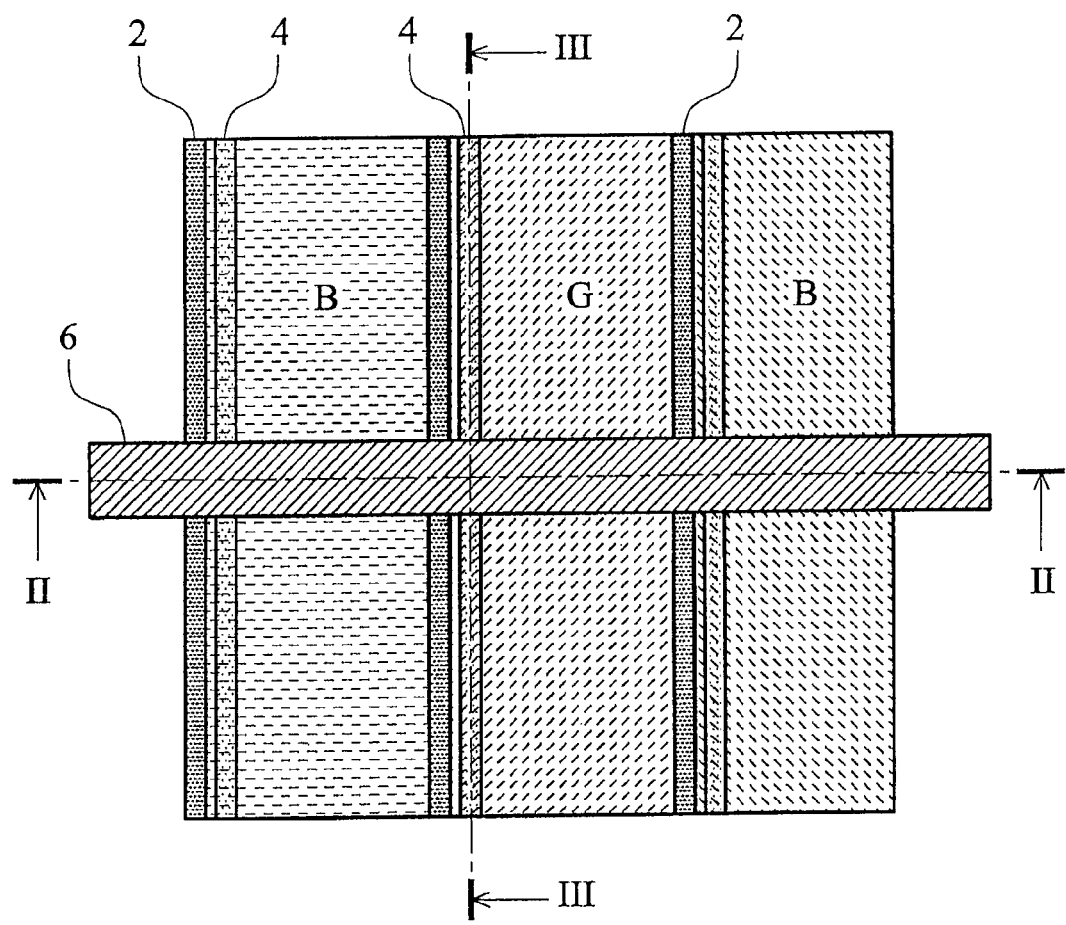
FIG. 1 shows a first example of display device of the invention.

FIG. 1 shows a pixel of a first example of display device of the invention.

The display comprises a colour LCD display. One pixel is shown in FIG. 1 in plan view, and comprises a typical vertical strip Red (R), Green (G) and Blue (B) pixel layout.

The pixels comprise colour filters to define the three colours. Black mask areas 2 are shown between the colour filters, and the column conductors 4 are also shown.

The pixel layout and technology used for the display device can be entirely conventional. For example, the liquid crystal display can comprise an active plate and a passive plate between which liquid crystal material is sandwiched. The active plate comprises an array of transistor switching devices, typically with one transistor associated with each pixel of the display. Each pixel is also associated with a pixel electrode on the active plate to which a signal is applied for controlling the brightness of the individual pixel. Row and column addressing conductors on the active plate connect to the pixel circuits. The display device also includes row and column addressing circuits (so-called row and column drivers). These are standard features of an active matrix display device, and for this reason they are not described in further detail or shown in detail in the drawings.

In accordance with the invention, a top light 6 is provided which crosses each row of pixels perpendicularly. The top light can be a patterned LED (for example organic LED) light source.

Figure 2:
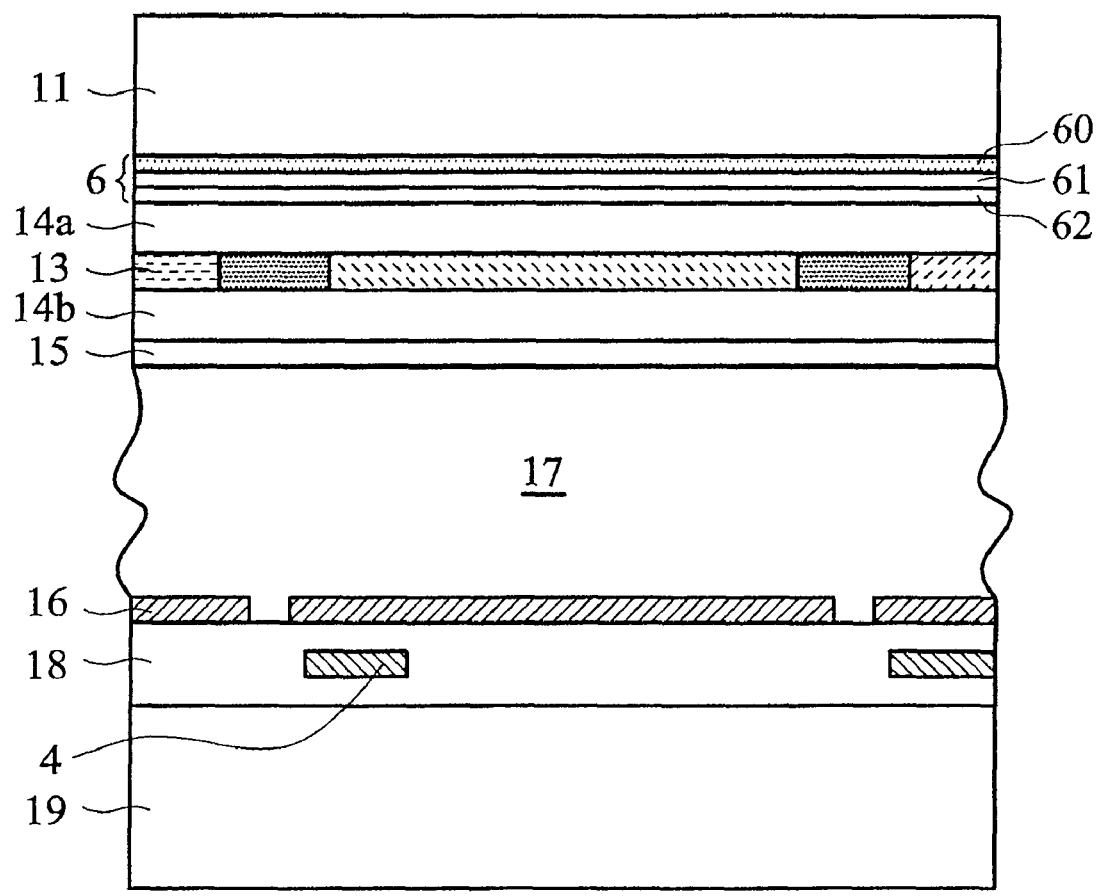
FIG. 2 is a cross section through line II-II of FIG. 1.
Figure 3:
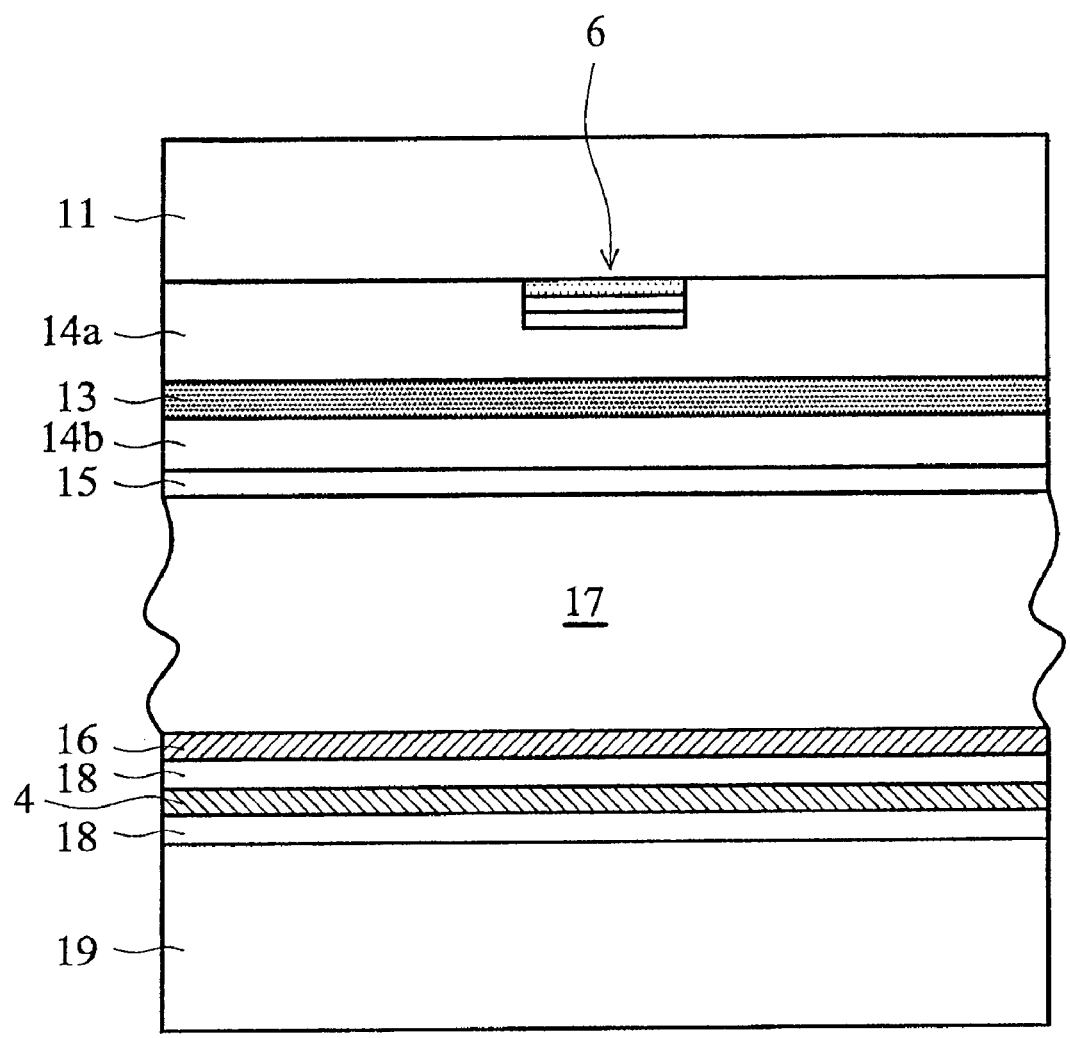
FIG. 3 is a cross section through line III-III of FIG. 1.

FIG. 2 is a horizontal cross-section through line II-II in FIG. 1 and FIG. 3 is a vertical cross-section of the cell through line III-III in FIG. 1.

In FIG. 2, reference 11 is the passive plate substrate (the top plate), on which is provided the LED device 6. This comprises a metal electrode layer 60, the white LED layer 61 and a transparent electrode layer 62, such as ITO.

A colour filter layer is shown as 13, sandwiched between planarising layers 14a, 14b as necessary. One of these planarising layers can comprise an in-cell polariser and may be a multilayer stack.

The passive plate ITO layer is shown as 15, and this defines a common electrode for the control of the LC display.

Reflective metal pixel electrodes 16 are provided on the active plate, and these are used to modulate the LC material 17. The column electrodes 4 are in the active matrix, and these can be hidden under the pixel electrodes, as shown to reduce non-modulated reflectivity.

The area 18 represents the active matrix layers (in schematic block form) which define the pixel circuits, and also include the row conductors. Planarisation layers are also provided. The active plate glass substrate is shown as 19 and includes active matrix pixel circuits associated with the display pixel electrodes 16.

The structure is thus a conventional LCD structure, but with the integration of an LED light source into the structure of the device, and functioning as a top light. This enables a fully reflective display pixel structure to be provided, with no backlight.

The same layers are shown in FIG. 3, and this also shows the patterning of the LED 6 in more detail. In the example of FIG. 3, the two electrode layers 60, 62 and the LED layer 61 are patterned to define a plurality of light source strips.

Figure 4:
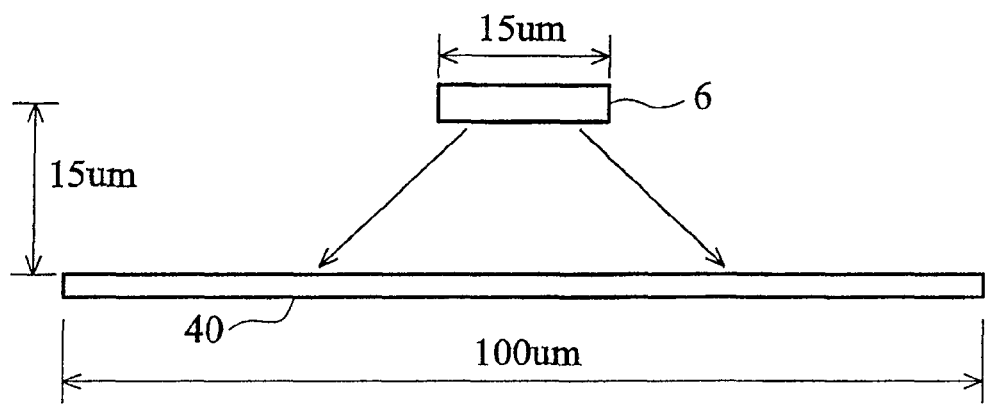
FIG. 4 shows in greater detail the lighting provided in the device of the invention.

FIG. 4 shows typical dimensions to scale, and shows that each pixel 40 (for example with a pixel pitch of 100 um) may be illuminated reasonably uniformly by an LED strip 6. Perfect uniformity of the illumination is not essential, and it is more important that all pixels are illuminated in the same way.

The width of the lighting strip is shown as 15 um, so that it occupies approximately 15% of the pixel area. However, as no opening is required in the pixel electrodes to allow light to enter from a backlight, the performance of the pixel (in particular the pixel aperture) can be better than for transflective pixel designs. The height from the lighting strip to the pixel electrode is shown as 15 um, based on the LC thickness and layers in a typical LCD design. The light output from the LED strip enables the 100 um width to be covered.

Figure 5:
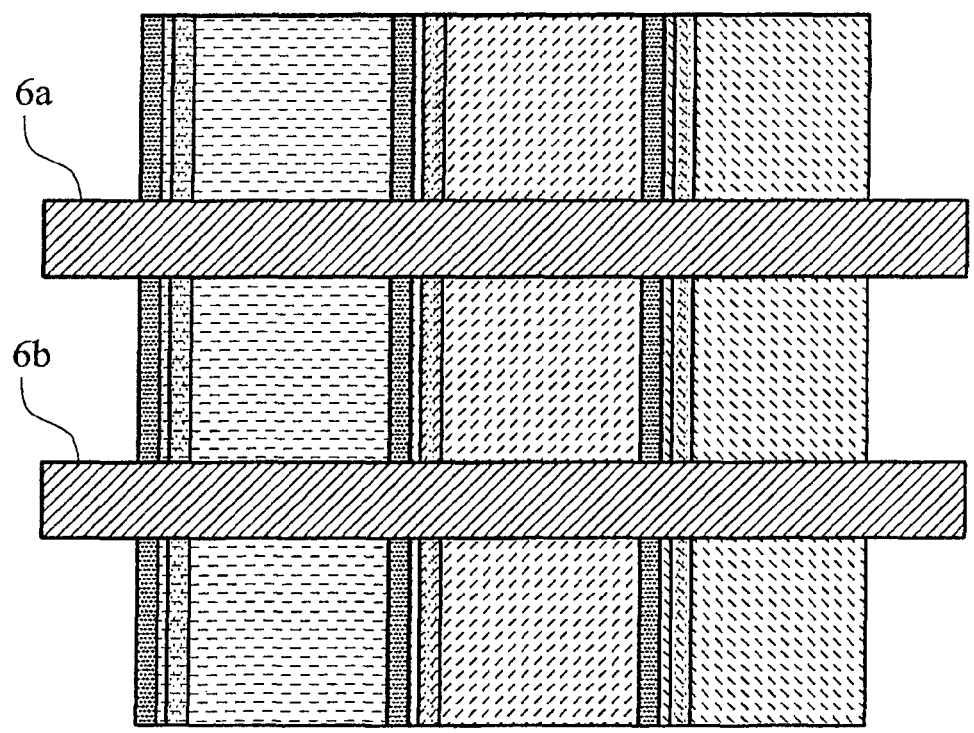
FIG. 5 shows a second example of display device of the invention.

In the example above, there is one lighting strip extending across each pixel. FIG. 5 shows one of many possibilities for having multiple LED strips in the pixel, and shows an example with two LED strips 6a, 6b. This could be to improve uniformity, or for perceptual advantages gained by the black mask this provides. Additionally, for RGBW or other multi-primary layouts this could prove advantageous perceptually.

The LED strips could be driven together acting as a full backlight, or segmented into individual rows, bands, or interlaced bands. One such use of this would be for scrolling lighting to reduce sample and hold effects. The idea of a scrolling backlight will be well known to those skilled in the art, and the lighting arrangement of the invention can implement a similar lighting effect.

Figure 6:
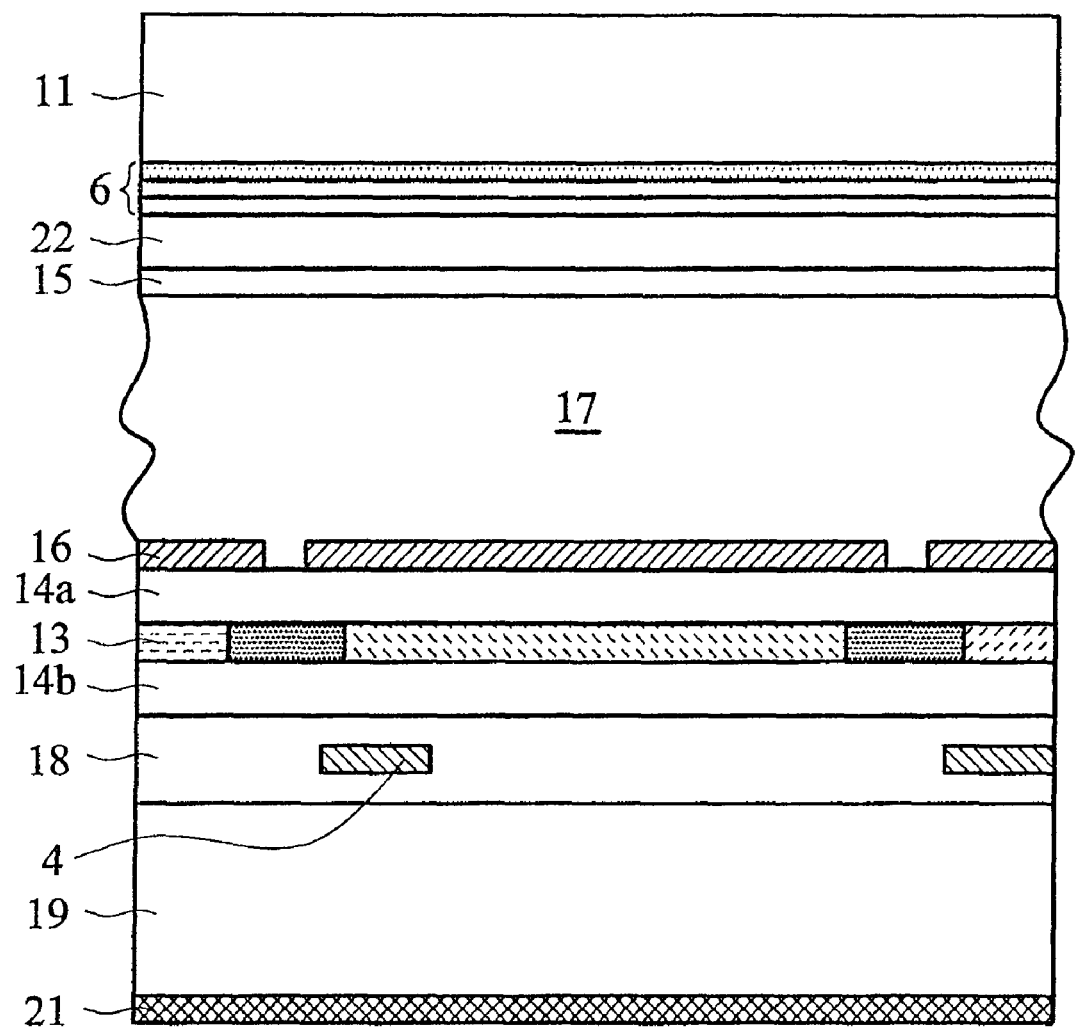
FIG. 6 shows a third example of display device of the invention.

FIG. 6 shows an alternative construction with colour filter 13 on the active plate. This requires transparent pixel electrodes, and an external reflector 21 beneath the colour filter 13. A polarizer/planarization layer is shown as 22 on the passive plate.

Figure 7:
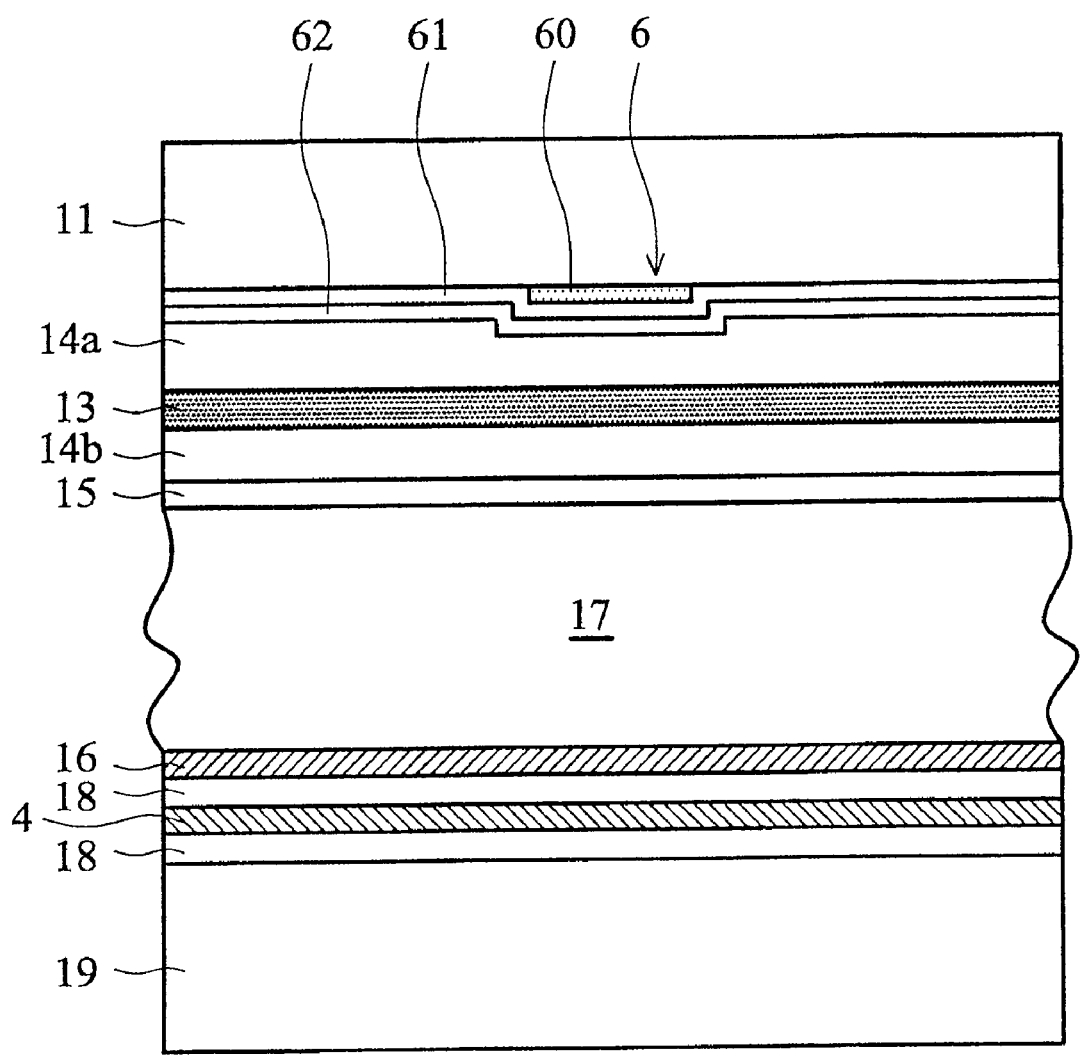
FIG. 7 shows a fourth example of display device of the invention.

In the example above, all layers of the LED structure are patterned. FIG. 7 shows an arrangement where the transparent ITO electrode 62 and LED layer 61 are unpatterned, so that the high ITO resistance is less of an issue, and step coverage and yield is improved.

Figure 8:
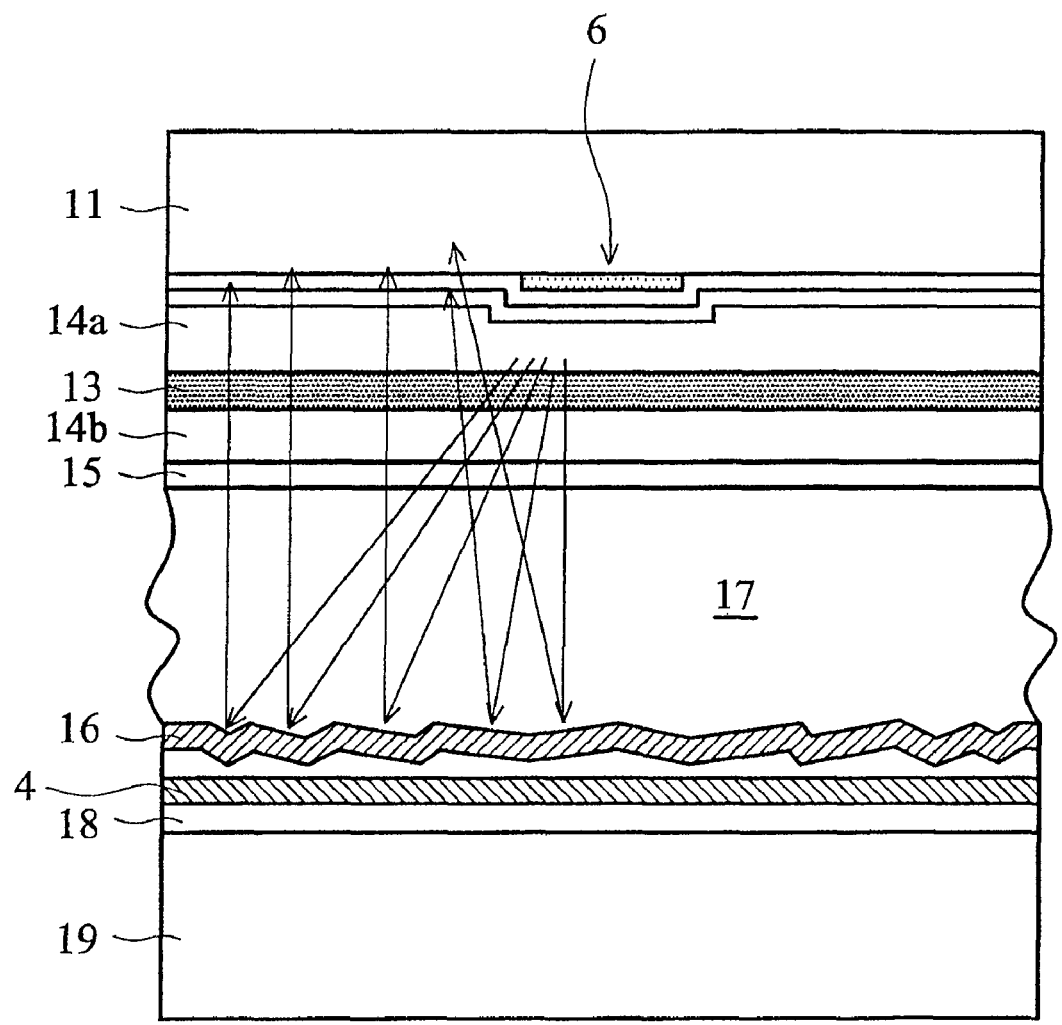
FIG. 8 shows a fifth example of display device of the invention.

FIG. 8 shows that the reflector (i.e. the pixel electrodes) can be textured using the active plate passivation layer, to improve the directionality of the light, or to improve the uniformity of the emission across the pixel. By this is meant that the surface of the pixel electrode is not a flat planar surface, but instead has a surface with a local normal in different directions. The angle of the reflector is selected to provide a desired direction of the reflected light from that part of the reflector surface. As shown schematically, the normal directions can be chosen so that the illumination from the light source strip is reflected in such a way that the spread of angles is reduced. This gives an improved directional output. Patterning of the layer beneath the pixel electrode, with a conformal pixel electrode layer on top, can be used to define the desired pixel electrode contour.

The invention is of particular interest for mobile display products. The invention provides a low power lighting solution and which enables high quality reflective image generation.

The different layers forming the structure of the liquid crystal display have not been described in detail, in particular the layers forming the transistors and row and column conductors of the active plate. This is because these parts of the design can be entirely conventional, and many different designs are possible. The invention relates to the integration of the light source into the passive plate.

The patterned LED light source can also be based on known LED designs. For example, an organic LED device (OLED) can be used. There are two basic types—a so-called "small molecule" OLED and a polymer LED.

Small molecule OLEDs can have up to 4 polymer layers, of thickness 0.01 μm to 0.1 μm. These layers can comprises a hole injection layer (HIL), hole transport layer (HTL), emissive layer (EML) and electron transport layer (ETL). The top metal is typically a bi-layer of Li or LiF and Al.

A polymer diode generally has 2 polymer layers, poly(3, 4-ethylenedioxy)thiophene (PEDOT) on the ITO as a hole injection layer (HIL) and then an emissive layer. These vary in thickness from 0.01 μm to 0.1 μm typically. The top metal is again a bi-layer, for example of Ca and Al or Ba and Al.

In both designs, the reactive metal is thin (typically 0.05-0.1 μm) and the Al thick (typically 0.5 μm) for conductivity.

The emissive layers can be blends to provide the desired white light output.

The patterning of the light source can be in rows, with one or more rows passing along each display pixel row, as described above. This is preferred if the pixels are arranged as RGB sub-pixels in the row direction as shown, so that each light source strip can illuminate all the sub-pixels. However, the light source could be arranged differently, and this may be appropriate for other sub-pixel designs. For example, the light source could be arranged as column strips, or even as a more complicated mesh pattern, again to match different sub-pixel layouts, and to ensure that all sub-pixels can be illuminated.

The light source can be controlled as a single unit providing blanket illumination, or else individual parts of the pattern can be independently addressable, for example for backlight scrolling as described above. This simply requires a driver at the edge of the display area which connects to a tail from each light source portion—similar to the row or column driver of the active plate. One electrode of the light source can be a common electrode, and the other electrode can be used to drive the selected light source portion. If the transparent electrode is used as the common electrode, then it does not need to be patterned at all, as in one example above. The implementation will be completely routine to those skilled in the art.

Various other modifications will be apparent to those skilled in the art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a lower substrate, comprising transparent pixel electrodes;
   an upper substrate;
   a liquid crystal layer provided between the lower and upper substrates;
   a light source provided on the upper substrate for illuminating the display electrodes through the liquid crystal layer, wherein the light source comprises an opaque electrode layer, an LED layer over the opaque electrode layer on the side of the opaque electrode layer facing the liquid crystal layer, and a transparent electrode layer over the LED layer on the side of the LED layer facing the liquid crystal layer;
   a polarizer provided on the upper substrate, physically contacting the light source; and
   an external reflector provided on the lower substrate from a surface thereof without the transparent pixel electrodes.

2. The device as claimed in claim 1, wherein the light source comprises a plurality of strips, with one or more strips associated with each row of display pixels.

3. The device as claimed in 1, wherein the light source provides a white light output.

4. The device as claimed in claim 1, wherein the upper substrate further comprises a colour filter arrangement.

5. The device as claimed in claim 1, wherein the lower substrate further comprises a colour filter arrangement.

6. The device as claimed in claim 1, wherein the upper substrate further comprises a common electrode for the control of the liquid crystal layer.

7. The device as claimed in claim 1, wherein the lower substrate further comprises active matrix pixel circuits associated with the display pixel electrodes, and row and column addressing conductors which connect to the pixel circuits.

8. The device as claimed in claim 1, wherein the reflective display pixel electrodes are textured.

9. A control method for a display device, comprising:
   providing a display device comprising a lower substrate, an upper substrate, a liquid crystal layer, a polarizer, an external reflector, and a light source, wherein the lower substrate includes transparent pixel electrodes, wherein the liquid crystal layer is between the lower and upper substrates, and the light source is provided on the upper substrate for illuminating the display electrodes through the liquid crystal layer, wherein further the light source comprises an opaque electrode layer, an LED layer over the opaque electrode layer on the side of the opaque electrode layer facing the liquid crystal layer, and a transparent electrode layer over the LED layer on the side of the LED layer facing the liquid crystal layer, and wherein the opaque electrode layer, the transparent electrode layer, and the LED layer are all patterned to define a plurality of light source portions, and wherein the polarizer is on the upper substrate and physically contacts the light source and wherein the external reflector is positioned on the lower substrate from a surface thereof without the transparent pixel electrodes;
   in high ambient light conditions, providing a display output using reflected ambient light from reflective display pixel electrodes provided on the lower substrate, said reflected ambient light passes through the liquid crystal layer which modulates the light and through the upper substrate; and
   in low ambient light conditions, operating the light source provided on the upper substrate to illuminate the display electrodes through the liquid crystal layer, wherein the light source can be driven together acting as a full backlight, or segmented into individual rows, bands, or interlaced bands.

* * * * *